(No Model.)
D. O. FRANCKE.
MANUFACTURE OF PAPER PULP.
No. 295,865. Patented Mar. 25, 1884.
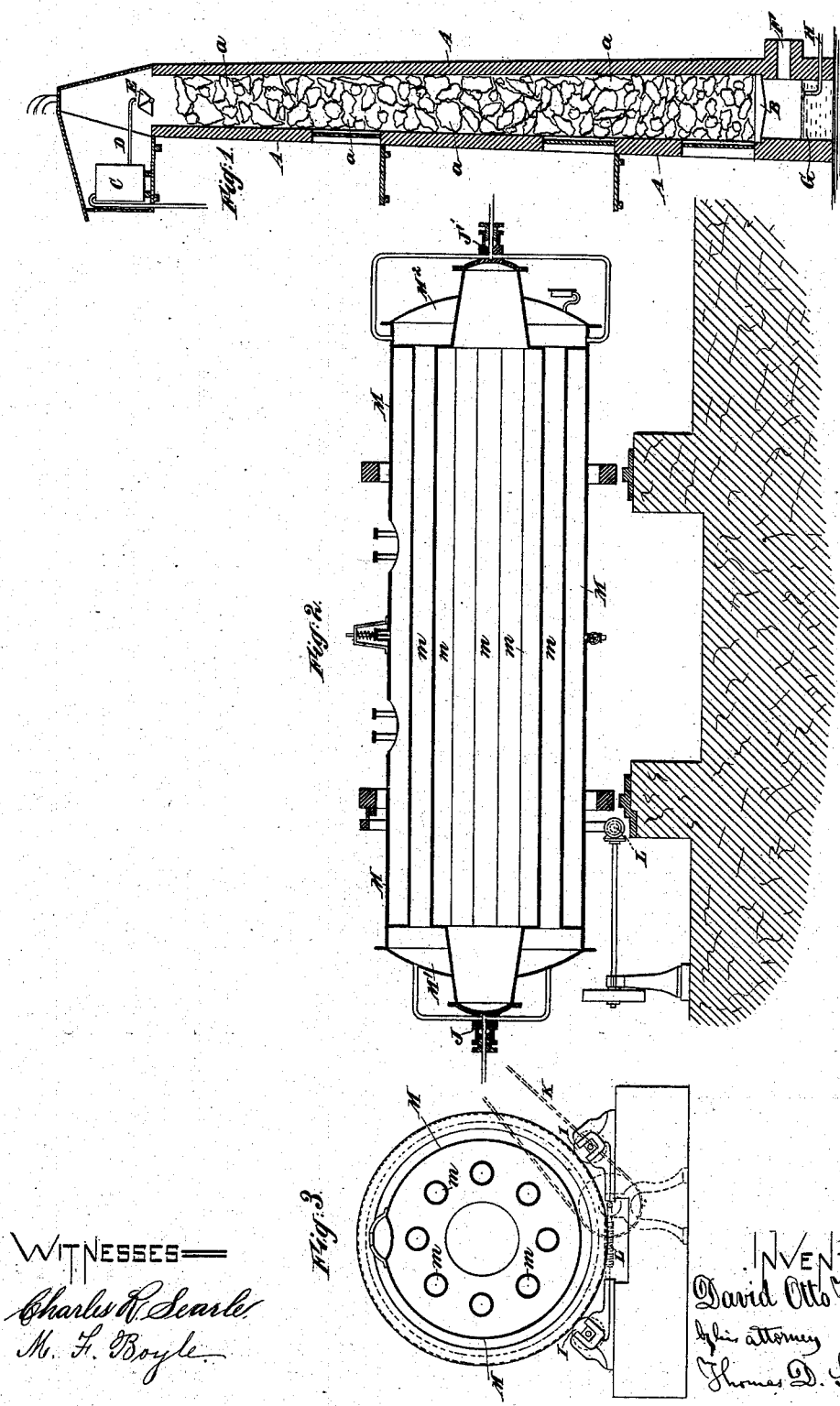

UNITED STATES PATENT OFFICE

DAVID OTTO FRANCKE, OF KORNDAL MÖLNDAL, SWEDEN.

MANUFACTURE OF PAPER-PULP.

SPECIFICATION forming part of Letters Patent No. 295,865, dated March 25, 1884.

Application filed October 29, 1881. (No model.) Patented in England October 11, 1881, No. 4,419, and December 17, 1881, No. 5,532; in France October 13, 1881, No. 145,317; in Canada November 12, 1881, No. 13,695, and in Italy December 31, 1881, XXVII, 2,020.

*To all whom it may concern:*

Be it known that I, DAVID OTTO FRANCKE, a citizen of Sweden, residing at Korndal Mölndal, in the Kingdom of Sweden, have invented an Improved Manufacture of Paper-Pulp, (for which I have obtained patents in Great Britain, No. 4,419, dated October 11, 1881, and No. 5,532, dated December 17, 1881; in France, No. 145,317, dated October 13, 1881; in Canada, No. 13,695, dated November 12, 1881, reissued, and in Italy, Vol. XXVII, No. 2,020, dated December 31, 1881,) of which the following is a specification.

My invention relates to the manufacture of paper-pulp from wood, esparto, wheat, maize, or other straw, or from other suitable vegetable fiber, the object which I have in view being to produce in a cheap and easy way pulp of high quality fit for making paper, with or without the addition of rag or other pulp.

For this purpose I prepare a solvent, which is the acid sulphite of an alkaline earth or of an alkali—that is to say, a solution of such sulphite with an excess of sulphurous acid. As the cheapest and most accessible base, I prefer lime. It has long been known that a solution of sulphite of lime combined with free sulphurous acid will at a high temperature tend to dissolve the undesirable portions of vegetable structures, and tend to leave the fibers in a fit condition for paper manufacture. I have, by prolonged and careful experiments on a large scale, determined the conditions for effecting this with rapidity, and so as to preserve the strength of the resulting fibers and attain a practical and successful method of manufacturing paper-pulp by this means. I employ only a moderate strength of the solution with a high temperature and gentle but constant mechanical agitation. I have devised a method of producing the acid sulphite in large quantities at small cost, and supplying it at a temperature nearly up to that required with agitation for its most effective use. I charge a tower or column with fragments of limestone, which I keep wetted by a shower of water, and pass through the tower sulphurous-acid fumes produced by burning sulphur or by roasting or calcining sulphides, such as pyrites. The liquid which collects at the bottom of the tower is the solvent required which should have a strength of 4° to 5° Baumé. It is not essential that the limestone should be pure, as mineral containing a proportion of magnesia, or of other alkaline earth or mineral—such as witherite—will answer well; also, minerals consisting, principally, of magnesia or of alkaline earths other than lime may be employed, their treatment being the same as for limestone. The soluble alkalies soda and potassa may also be used when their greater cost is not objectionable. For these alkalies the treatment has to be modified as follows: The tower or column is charged with fragments of inert porous material—such as coke or bricks or porous stone—and these are kept wetted by a shower of a solution of the caustic alkali, which solution should have a strength of 1° to 2° Baumé, while the sulphurous-acid fumes are passed through the tower. In like manner the carbonates of soda or potassa may be treated; but when they are employed the solution showered on the porous material should be stronger than that of the caustic alkali, so that it may contain approximately the same amount of actual alkali. Whatever be the alkaline base employed, the liquid collected at the bottom of the tower, having, as stated above, a strength of 4° or 5° Baumé, and being the acid sulphite of the base, or a solution of the sulphite with excess of sulphurous acid, is the solvent which I employ for the manufacture of pulp, as I will now describe: When wood is the material to be treated for pulping, I free it as much as possible from resinous knots by boring or cutting them out, and then I cut it, by preference, obliquely into slabs or fragments, which may be from one-quarter to three-quarters of an inch thick. When esparto, straw, or analogous fiber is to be treated, it is cut or chopped into fragments. The fibrous material is charged, along with the solvent, into a strong vessel or boiler, which is heated by a steam casing or coil or by steam-tubes, the steam employed being at a pressure of four to five atmospheres, and consequently capable of raising the solution to the temperature of about 300° Fahrenheit. As agitation greatly promotes the pulping action, I employ a vessel or boiler of cylindrical form, which is caused to revolve while its charge is under treatment. Such a vessel is conveniently made with a steam-jacket at each end, connected by longitudinal tubes, the steam being supplied through its trunnions, the steam entering through one end, and the water of condensation being removed through the other.

The accompanying drawings form a part of this specification, and represent what I consider the best means of carrying out the invention.

Figure 1 is a central vertical section through the tower and its contents which I employ for the production of the solvent. Fig. 2 is a longitudinal section through the vessel in which I treat the pulp, and Fig. 3 is a cross-section of the same.

Similar letters of reference indicate corresponding parts in all the figures.

A is a tower loosely filled with irregular lumps, $a$, of carbonate of lime, (ordinary limestone,) supported on a grate, B.

E is a tilting distributing-vessel, to which water is supplied through a pipe, D, from an elevated tank, C, kept filled by a pump or other suitable means, and allowed to trickle down over the surfaces of the limestone below. There is a furnace (not represented) in which iron or copper pyrites are roasted, the sulphurous-acid fumes therefrom being led through the flue F into the base of the tower A and allowed to move upward through the interstices between the pieces of limestone $a$, such portion of the fumes as are not absorbed escaping freely at the top. The sulphurous acid is absorbed by the water, which, becoming acid, attacks the carbonate of lime, setting free the carbonic acid and combining with the lime, forming sulphite of lime. The conditions are such that a just sufficient quantity of free acid will remain in the solution, which will accumulate in the tank G at the bottom, and ultimately flow out through the pipe H into any suitable retaining-reservoir. (Not shown.)

I represents anti-friction supporting-rollers mounted in fixed bearings. M is a cylindrical vessel resting thereon, and revolved slowly by a screw, L, operated by gears driven by a steam-engine or other suitable power through a belt, K. The vessel M has tubes $m$ communicating between chambers M' M² in the ends thereof. Steam at a pressure of four or five atmospheres is supplied from a boiler (not represented) through a tightly-packed swiveling connection, J, at one end, and the water of condensation, with a small quantity of the steam, is allowed to escape at the other end, controlled by a suitable valve. (Not represented.) The acid sulphite thus cheaply formed is pumped or otherwise supplied into the vessel M in such quantities that, with the wood, straw, or other material also inserted, the vessel shall be about three-quarters full. Then the orifice through which it is charged and removed being tightly closed by a suitable cover and secured, so as to allow a considerable pressure within, the vessel M, with its contents, is rotated by the gearing, making, preferably, one revolution in about ten minutes. The solution is received warm, and the steam in the pipes $m$ rapidly raises it to a temperature of about 300° Fahrenheit, with the corresponding pressure. The rotation of the vessel gives an efficient but moderate agitation. The proportion of solvent required varies according to the character of the material treated. I find that from two thousand to twenty-five hundred gallons of the solvent generally suffices for the production of one (1) ton of wood pulp. For esparto, straw, and the like, the quantity of solvent may be somewhat less; but the best proportions are soon learned by experience. The material, having thus in presence of solvent been subjected to heat and pressure with agitation for twelve to fifteen hours, is withdrawn from the vessel, and, being well washed with water, is in the condition of pulp which is ready for paper-making, but which, when great whiteness is required, may be bleached like ordinary pulp.

Modifications may be made in the forms and proportions of the several pieces of apparatus employed without departing from the principle or sacrificing the advantages of the invention. A stationary vessel may be employed equipped for resisting internal pressure, in lieu of the revolving vessel M, extended steam-heating surfaces or other efficient means being employed for rapidly imparting the required temperature, and suitable means being employed for effecting a continuous gentle agitation. Acid sulphite has been before used in analogous relations; but in no case known to me has a superior pulp been made thereby at a single operation, and in no case has an alkaline sulphite, with excess of sulphurous acid, been used in connection with heat, pressure, and agitation to produce such pulp at a single operation. With the process which I have set forth and the apparatus described, I have demonstrated that a superior and desirable pulp can be obtained in a much shorter period of time than has been before known.

I claim as my invention—

1. As a preliminary step in the manufacture of paper, the method described of producing an acid-sulphite solution of proper strength and nearly the proper temperature for use in paper-pulp manufacture by presenting hot sulphurous-acid fumes to solid alkali in the presence of a small quantity of water allowed to trickle down over the solid surfaces, as herein specified.

2. The method described of manufacturing paper-pulp at a single operation by subjecting wood or analogous vegetable matter in a divided state to gentle mechanical agitation with acid sulphite at a temperature of about 300° Fahrenheit and a strength of 4° or 5° Baumé, all substantially as herein specified.

3. The process of manufacturing paper-pulp from wood and analogous vegetable fiber by subjecting the material in a divided state to the action of acid sulphite under heat and pressure at a single operation, substantially as herein specified.

In testimony whereof I have signed my name to this specification, in the presence of two subscribing witnesses, this 14th day of October, A. D. 1881.

DAVID OTTO FRANCKE.

Witnesses:
OLIVER IMRAY,
JNO. P. M. MILLARD.